United States Patent
Taki

(10) Patent No.: US 11,893,802 B2
(45) Date of Patent: Feb. 6, 2024

(54) SYSTEMS AND METHODS FOR TRAFFIC LIGHT IDENTIFICATION

(71) Applicant: TOYOTA MOTOR EUROPE, Brussels (BE)

(72) Inventor: Naoki Taki, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 354 days.

(21) Appl. No.: 17/270,550

(22) PCT Filed: Sep. 21, 2018

(86) PCT No.: PCT/EP2018/075685
§ 371 (c)(1),
(2) Date: Feb. 23, 2021

(87) PCT Pub. No.: WO2020/057754
PCT Pub. Date: Mar. 26, 2020

(65) Prior Publication Data
US 2021/0287024 A1 Sep. 16, 2021

(51) Int. Cl.
*G06V 20/58* (2022.01)
*B60W 60/00* (2020.01)
*B60W 40/04* (2006.01)

(52) U.S. Cl.
CPC ........... *G06V 20/584* (2022.01); *B60W 40/04* (2013.01); *B60W 60/0015* (2020.02);
(Continued)

(58) Field of Classification Search
CPC ............. B60W 40/04; B60W 60/0015; B60W 2420/42; B60W 2554/40
See application file for complete search history.

(56) References Cited

U.S. PATENT DOCUMENTS 9,158,980 B1 10/2015 Ferguson et al.
2011/0054777 A1* 3/2011 Rossio ............... G01C 21/3644
701/533
(Continued)

FOREIGN PATENT DOCUMENTS

DE 102013003798 A1 * 9/2014 ............. B60K 35/00

OTHER PUBLICATIONS

Non-Final action of U.S. Appl. No. 17/088,001 (dated Oct. 18, 2022) (Year: 2022).*
(Continued)

*Primary Examiner* — Peter D Nolan
*Assistant Examiner* — Tanya C Sienko
(74) *Attorney, Agent, or Firm* — Sughrue Mion, PLLC

(57) ABSTRACT

A traffic signal fixture verification system including an optical recognition means configured to obtain one or more images of two or more traffic signal fixtures in proximity to an ego vehicle, and to detect a motion status of one or more vehicles in proximity to the ego vehicle, a processing means configured to determine a relevance value for two or more traffic signal fixtures identified in the one or more images, monitor a status of each of two or more relevant traffic signal fixtures having a relevance value greater than a threshold value, and based on the relevance values of the two or more relevant traffic signal fixtures, the respective status of each of the two or more relevant traffic signal fixtures, and optionally, and/or the motion status of the one or more vehicles surrounding the vehicle, actuate an accelerator function or a braking function of the ego vehicle.

10 Claims, 6 Drawing Sheets

(52) U.S. Cl.
CPC ..... *B60W 2420/42* (2013.01); *B60W 2552/00* (2020.02); *B60W 2554/40* (2020.02)

(56) References Cited

U.S. PATENT DOCUMENTS

| | | | |
|---|---|---|---|
| 2011/0182475 A1* | 7/2011 | Fairfield | G05D 1/0212 |
| | | | 382/104 |
| 2016/0306361 A1* | 10/2016 | Ben Shalom | G05D 1/0276 |
| 2016/0318490 A1 | 11/2016 | Ben Shalom | |
| 2017/0355375 A1 | 12/2017 | Ferguson et al. | |

OTHER PUBLICATIONS

"Traffic Light Status Detection Using Movement Patterns of Vehicles" J. Campbell et al; 2016 IEEE 19th international Conference on Intelligent Transportation Systems (ITSC) Rio de Janeiro, Brazil, Nov. 1-4, 2016. (Year: 2016).*
Machine translation of DE102013003798-A1 downloaded from IP.com Sep. 15, 2023 (Year: 2023).*
"Alerting the Drivers about Road Signs with Poor Visual Saliency" L. Simon et al., 2009 IEEE Intelligent Vehicles Symposium (pp. 48-53) (Year: 2009).*
"Relevance Estimation of Traffic Elements Using Markov Logic Networks" D. Nienhuser et el., 2011 14th International IEEE Conference on Intelligent Transportation Systems Washington, DC, USA. Oct. 5-7, 2011 (Year: 2011).*
International Search Report for PCT/EP2018/075685 dated Jun. 14, 2019 (PCT/ISA/210).
Written Opinion for PCT/EP2018/075685 dated Jun. 14, 2019 (PCT/ISA/237).

* cited by examiner

SYSTEMS AND METHODS FOR TRAFFIC LIGHT IDENTIFICATION

CROSS REFERENCE TO RELATED APPLICATIONS

This application is a National Stage of International Application No. PCT/EP2018/075685 filed Sep. 21, 2018.

FIELD OF THE DISCLOSURE

The present disclosure is related to systems and methods for road indicator recognition, and more particularly, to improved identification of a status of one or more traffic lights.

BACKGROUND OF THE DISCLOSURE

Various systems exist for providing assistance to drivers of motor vehicles. For example, one such area of assistance relates to automated traffic signal recognition.

Traffic signal recognition may be accomplished by using suitable devices (e.g., optical devices such as a camera) for perceiving or detecting the surroundings of a motor vehicle. Systems are available commercially, for example, both from automobile manufacturers, and from manufacturers of portable navigation devices (PNDs). The PND systems are based on GPS signals and map data for supplying the driver with information relating to traffic signals.

Some existing systems implement a camera device for improving recognition accuracy and robustness. The manufacturers of vehicles use front-mounted camera devices and means for combining signals with data relating to the driving state of the vehicle. A further option is means for combining signals with navigation devices.

US 2016/0306361 discloses using cameras to provide autonomous navigation features. A traffic light detection system is provided for a vehicle where one or more processing devices associated with the system receive at least one image of an area forward of the vehicle via a data interface, with the area including at least one traffic lamp fixture having at least one traffic light. The processing devices determine, based on at least one indicator of vehicle position, whether the vehicle is in a turn lane. Also, the processing devices process the received images to determine the status of the traffic light, including whether the traffic light includes an arrow. Further, the system may cause a system response based on the determination of the status of the traffic light, whether the traffic light includes an arrow, and whether the vehicle is in a turn lane.

SUMMARY OF THE DISCLOSURE

The present inventors have recognized that under some conditions, it may be difficult or even impossible to verify or even determine the status of a traffic signal applicable to the ego vehicle. Such difficulty can be caused by blocked fields of view (occlusions), inoperable traffic signals, unrecognized traffic signals, irrelevant traffic signals (e.g., tramway signals) etc.

Therefore, the present configurations are directed to solving these problems, with the goal of enabling autonomous driving and/or driving assistance with improved safety.

According to embodiments of the present disclosure, a traffic signal fixture verification system for an ego vehicle is provided. The system includes optical recognition means configured to obtain one or more images of two or more traffic signal fixtures in proximity to the ego vehicle, and to detect a motion status of one or more vehicles in proximity to the ego vehicle, and processing means. The processing means is configured to determine a relevance value for two or more traffic signal fixtures identified in the one or more images, monitor a status of each of two or more relevant traffic signal fixtures having a relevance value greater than a threshold value, and based on the relevance values of the two or more relevant traffic signal fixtures, the respective status of each of the two or more relevant traffic signal fixtures, and optionally, the motion status of the one or more vehicles surrounding the vehicle, actuate an accelerator function or a braking function of the ego vehicle.

By providing such a system, it becomes possible to identify or imply a traffic signal status and to verify that status, before action is taken by an autonomous driving system, or before driver assistance is provided (e.g., assisted braking and/or steering).

When a status of one of the two or more relevant traffic signal fixtures cannot be determined, a status of another of the two or more relevant traffic signal fixtures may be used for the actuation.

When the status of the two or more relevant traffic signal features are not identical, the status of the relevant traffic signal having a higher relevance value may be used for the actuation.

When the status of the two or more relevant traffic signal features are not identical, the status of the relevant traffic signal having a highest safety factor may be used for the actuation.

A status having a highest safety factor may correspond to a red light of a traffic signal fixture.

The processing means may be configured to receive map data associated with traffic signal fixture locations, and to use the map data in the relevance determination.

A distance of each of the two or more relevant traffic signals from the ego vehicle may be considered in the relevance value determination.

Upon detection of a change in motion status of the one or more vehicles surrounding the vehicle greater than a threshold percentage change, the change in motion status may be considered for the actuating.

According to further embodiments of the disclosure, a method for verifying a status of a traffic signal fixture is provided. The method includes obtaining one or more images of two or more traffic signal fixtures in proximity to the ego vehicle. detecting a motion status of one or more vehicles in proximity to the ego vehicle, determining a relevance value for two or more traffic signal fixtures identified in the one or more images, monitoring a status of each of two or more relevant traffic signal fixtures having a relevance value greater than a threshold value, and actuating an accelerator function or a braking function of the ego vehicle based on the relevance values of the two or more relevant traffic signal fixtures, the respective status of each of the two or more relevant traffic signal fixtures, and optionally, a motion status of the one or more vehicles surrounding the vehicle.

When a status of one of the two or more relevant traffic signal fixtures cannot be determined, a status of another of the two or more relevant traffic signal fixtures may be used for the actuation.

When the status of the two or more relevant traffic signal features are not identical, the status of the relevant traffic signal having a higher relevance value may be used for the actuating.

When the status of the two or more relevant traffic signal features are not identical, the status of the relevant traffic signal having a highest safety factor may be used for the actuation.

The method may include receiving map data associated with traffic signal fixture locations, and to using the map data in the relevance determination.

Upon detection of a change in motion status of the one or more vehicles surrounding the vehicle greater than a threshold percentage change, the change in motion status is considered for the actuating.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
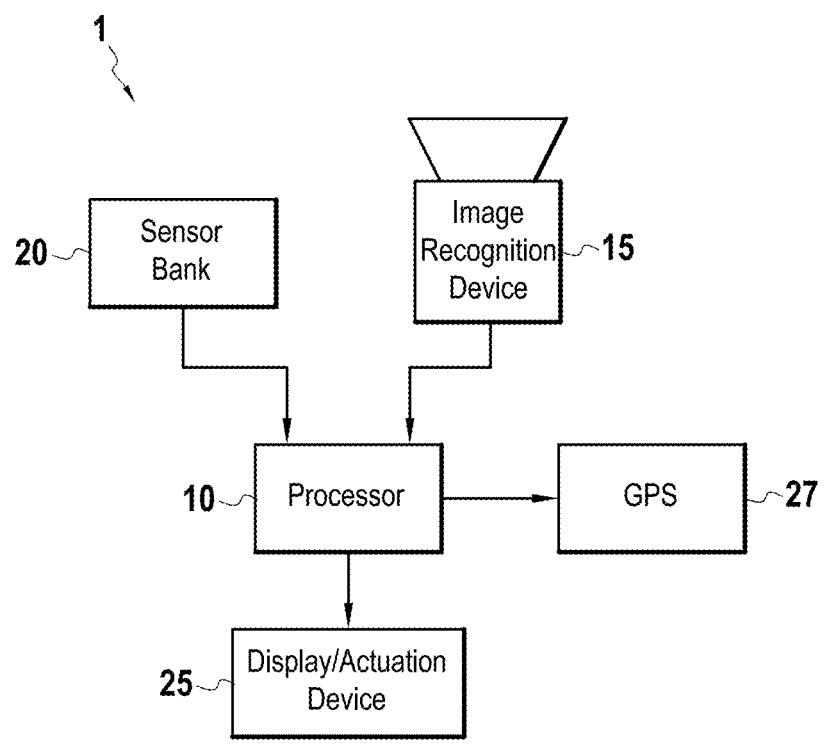
FIG. 1 shows an exemplary driver assistance system according to embodiments of the present disclosure.

FIG. 1 shows an exemplary driver assistance system 1 according to embodiments of the present disclosure. The driver assistance system 1 may include processing means, such as an electronic control unit (ECU) 10, image obtaining means 15 such as a camera, one or more sensors 20, and a display/actuator 25 among others. According to some embodiments, a global positioning system (GPS) 27 may be optionally provided, as desired, for example to provide additional data regarding location and maps to ECU 10.

Display/actuator 25 may be configured to display information provided by ECU 10 to a driver of ego vehicle 2 and/or to issue commands causing actuation of various vehicle systems in an automated or assisted driving scenario (e.g., accelerate, brake, turn, etc.)

Display 25 may be any suitable device for providing visible and/or audible information to a driver of ego vehicle 2. For example, display 25 may include a heads up display (e.g., on a windshield in front of a driver), a monitor, an in-dash display, etc. Further, where an actuator 25 is provided, such a device may be any suitable device for controlling various vehicle systems.

Image obtaining means 15 may include, for example, one or more cameras and/or other suitable devices configured to obtain optical data from an area surrounding a vehicle (e.g., in front of and peripherally of an ego vehicle). Image obtaining means 15 may be configured to process the data obtained from the surroundings of the vehicle to determine the existence of traffic signals 310, 320, 330, 340, 350, and road intersections (i.e., crossroads where a vehicle may either turn onto the crossroad, or continue straight on the current road). Such image obtaining means 15 are known in the art, and one of skill in the art will understand that any such image obtaining means 15 may be implemented in the present system without departing from the scope of the present disclosure. Examples of such image obtaining means are fisheye, long focus, and typical cameras on a number of vehicles presently in the automotive market.

Image obtaining means 15 may be located on an ego vehicle 2 so as to provide a reasonable field of view 4 of the surroundings of the ego vehicle 2 (e.g. a front and side view spanning approximately 180 degrees). For example, one or more image obtaining means 15 may be located behind the windshield, on a front bumper, a side view mirror, rearview mirror, and/or other suitable mounting location on the ego vehicle 2 so as to provide a field of view 4 of traffic signals 310, 320, 330, 340, 350 in proximity of the ego vehicle and intersections near the vehicle.

According to some embodiments it may be desirable to minimize visibility of image obtaining means 15 for aesthetic reasons, and one of skill in the art will understand that finding a mounting location suitable to achieve this goal while also providing adequate field of view surrounding the ego vehicle 2 to be a reasonable consideration.

The term "reasonable" when referring to field of view as used herein shall mean a field of view providing image obtaining means 15 with at least 150 degrees of spherical coverage in front of and on the periphery of the road surrounding the ego vehicle, better 160 degrees, even better 170 degrees, and better still 180 degrees.

Figure 2:
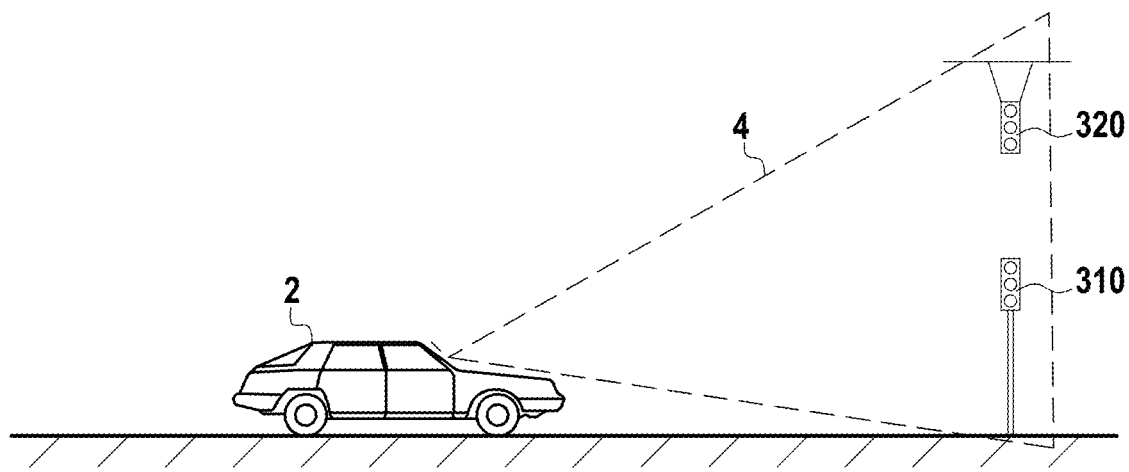
FIG. 2 is a diagram representing an exemplary vehicle including the driver assistance system of claim 1 while at an exemplary intersection on the road.
Figure 3:
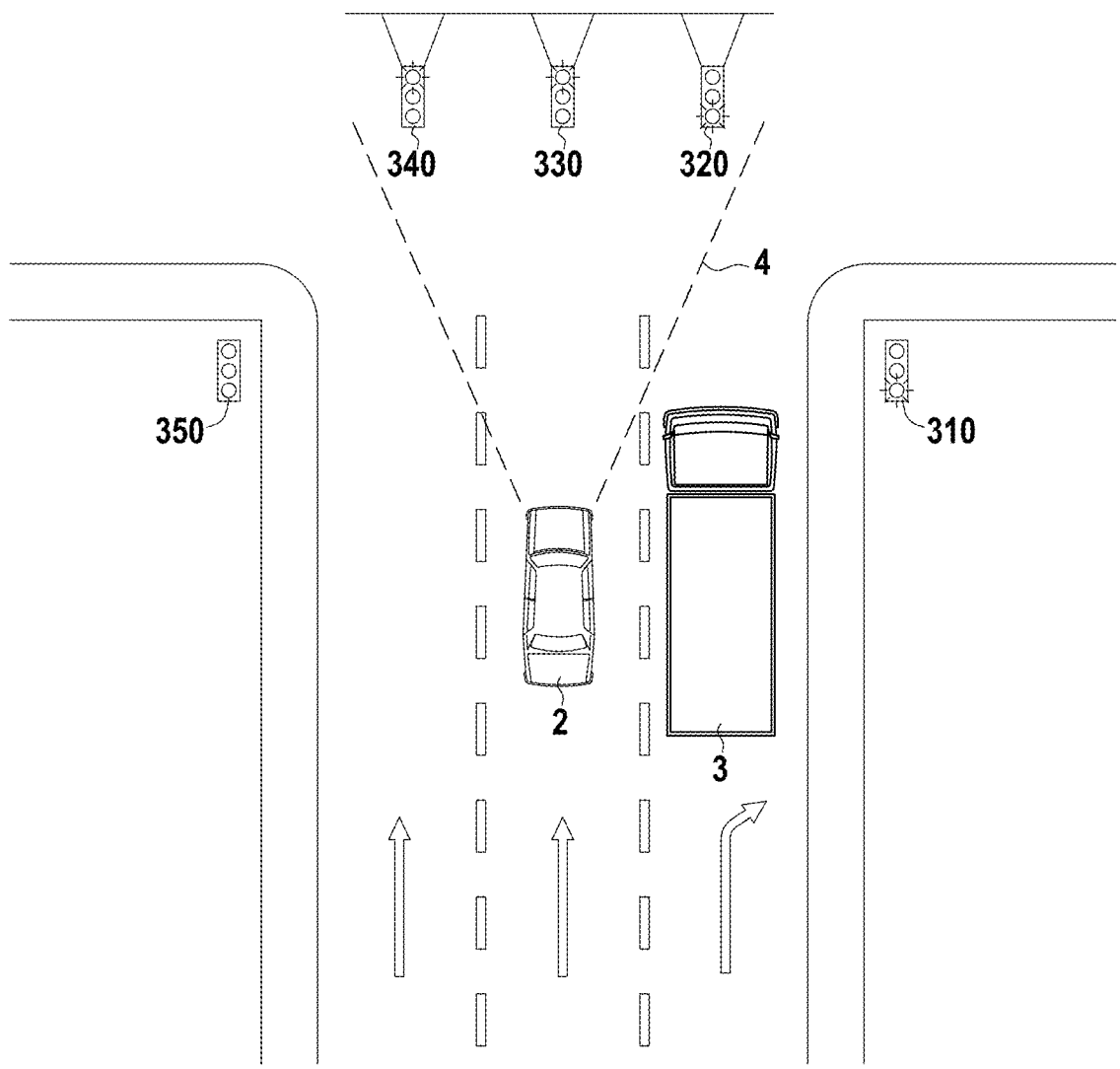
FIG. 3 is an overhead view of an exemplary situation similar to that of FIG. 2.

As shown at FIGS. 2 and 3 the FOV 4 of image obtaining means 15 may enable capture and detection of one or more traffic signals 310, 320, 330, 340, 350, from within the FOV 4. However, some of the traffic signals (e.g., traffic signals 310 and 350) may be outside of the FOV of image obtaining means 15, or otherwise blocked from view (e.g., by a vehicle 3) of image obtaining means 15. Thus, in some situations it may be difficult to verify the signal status (e.g., red, yellow, green, red turn signal, yellow turn signal, green turn signal, etc.) of one or more of the traffic signals applicable to ego vehicle 2, and embodiments of the present disclosure may be implemented to assist in making such a verification, as described in greater detail below.

Image obtaining means 15 may be configured to provide data regarding surroundings of an ego vehicle 2, including traffic signals 310, 320, 330, 340, 350 and intersecting roads to ECU 10. Such data may include, for example location of a traffic signal relative to ego vehicle 2, and status of each traffic signal detected (e.g., red light, yellow light, green light, turn indicator, etc.)

Image obtaining means 15 may provide such data to ECU 10 via a wired connection, a wireless connection, or other suitable method for transferring data to ECU 10. For example, image obtaining means 15 may include wireless communication means (e.g. IEEE 802.11 compliant Wi-Fi hardware) for transmitting data to ECU 10 and/or other devices that may use the data from image obtaining means 15. Alternatively or in addition, for example for safety purposes, a wired connection may be provided. Such a wired connection may be provided, for example, to provide fail-safe in a case where a wireless connection should cease to function.

When obtaining data related to a traffic signal, image obtaining means 15 may be configured to assign a time indicator (e.g., a timestamp) and/or position indicator (e.g., coordinate information) to the data. Alternatively, ECU 10 may be configured to assign a time indicator to the data upon receipt from image obtaining means 15. By assigning a time indicator to data obtaining by image obtaining means 15, an age of the data (i.e., time elapsed since a traffic signal status was identified) may be tracked by ECU 10, among others. This may be particularly useful when "learning" of traffic signal timing by a ECU 10 is undertaken.

ECU 10 may include any suitable device configured to manipulate data, perform calculations, execute code for decision making, and causing display of information to an operator of ego vehicle 2 and/or actuating various systems of the ego vehicle 2 (e.g., accelerator, braking, shifting, etc.) in order to carry out embodiments of the present disclosure. For example ECU 10 may include various analog and/or digital circuits, and may include integrated circuits such as RISC processors, i386 processors, ASIC processors, etc. Typically, onboard computers in modern vehicles include such processors, and one of skill will understand that the present ECU 10 may be comprised by such an onboard computer, or may be separately provided. One of skill in the art will also understand that the exemplary circuits and processors described herein are not intended to be limiting, and that any suitable device may be implemented.

ECU 10 may be linked to one or more databases and/or other memory (e.g., RAM, ROM, etc.) associated with ego vehicle 2 so as to enable storage of vehicle related data as well as values that may be utilized during processing of vehicle functions (e.g., threshold values, relevance values), such as traffic signal duration at a particular status (e.g., typical red light duration of 45 seconds, yellow light duration 2 seconds, etc.). One of skill in the art will recognize that information discussed herein with regard to any such databases and/or memory is not intended to be limiting.

ECU 10 may be configured to receive data from image obtaining means 15 and one or more sensors 20 providing functionality associated with the present disclosure. For example ECU 10 may receive map data regarding traffic signals from GPS 27, which may be used for validating a particular traffic signal configuration at an identified or even unidentified intersection. While a GPS 27 may be implemented to provide such data as a failsafe, embodiments of the present disclosure may also function in the absence of such map data.

Based on the data and the signal status information provided to ECU 10, ECU 10 may be configured to perform various operations for determining relevance, verifying a status, and setting of an operation flag related to operation of ego vehicle 2 based on one or more identified traffic signals.

Figure 4A:
FIG. 4A shows an exemplary traffic signal and its associated statuses.
Figure 4B:
FIG. 4B is an exemplary real-world intersection including multiple traffic signals.

FIG. 4A shows three primary status possibilities for a single traffic signal, i.e., far left a green signal indicating that a vehicle may proceed; far right, a red signal indicating that a vehicle must stop; and middle, a yellow signal indicating imminent change of the signal either from red to green or green to red. Similarly, FIG. 4B shows a situation in which vehicles turning left are permitted to proceed (special green arrow signal on left), but vehicles continuing straight or turning right are required to stop (red signal on right).

Figure 5A:
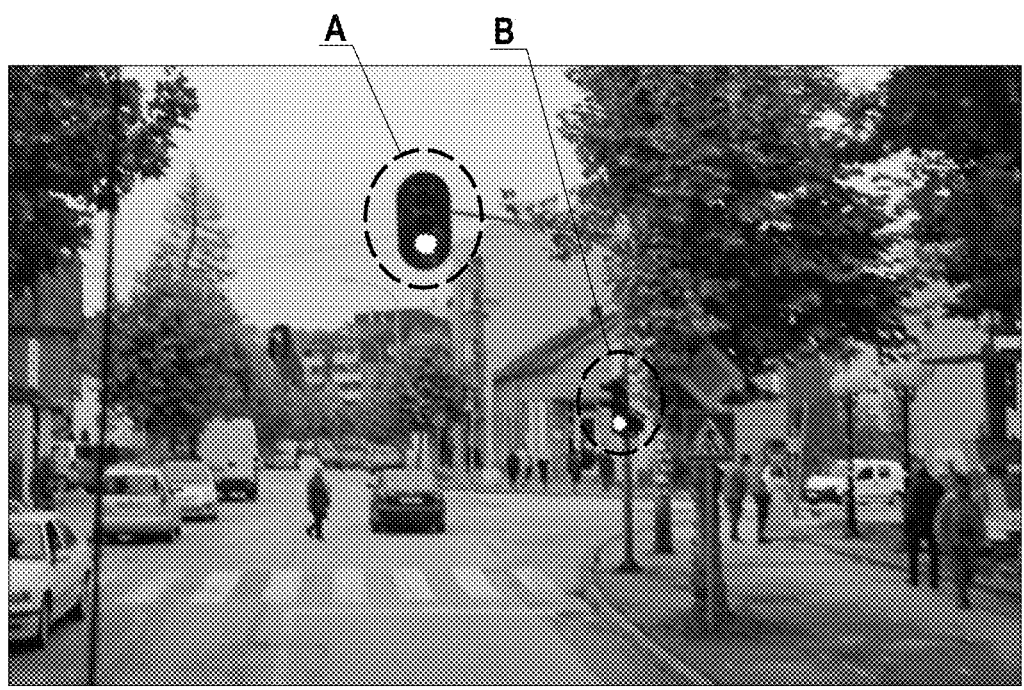
FIGS. 5A and 5B show two further exemplary intersections including multiple traffic signals.
Figure 5B:
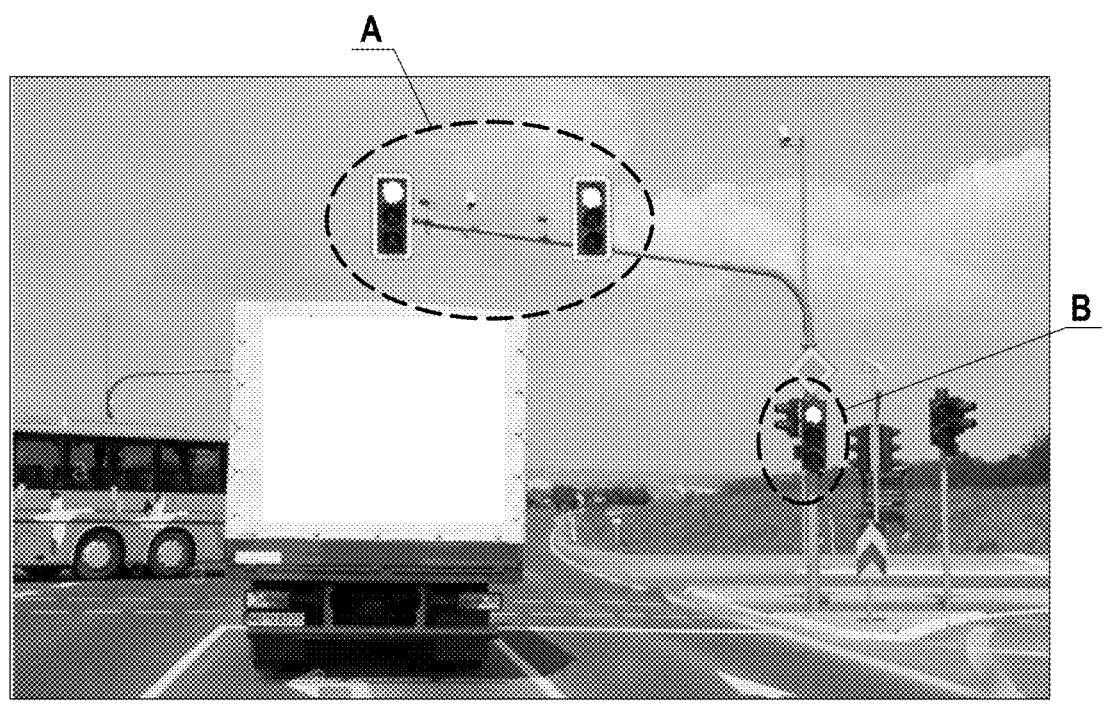

FIG. 5A shows a situation in which two traffic signal groups (i.e., group A and group B) both indicate a green status (i.e., proceed), while FIG. 5B shows a situation in which two overhead traffic signals (group A) and a lateral traffic signal (group B) indicate a red status (i.e., stop). One of skill will note that in each of the examples provided, it is possible that occlusions and/or FOV 4 of image obtaining means 15 may prevent ECU 10 from being provided information related to all traffic signals present at an intersection, and therefore, from making a sufficiently safe determination as to how to inform the driver of ego vehicle 2 and/or operate the vehicle in an automated driving scenario.

In typical scenarios, two or more traffic signals at a single intersection may have a relevance value above a threshold value $V_{th}$; one traffic signal may have a high relevance value, while a second traffic signal has a lower relevance value; one or more traffic signals having a high relevance value $V_{th}$ may be visible while one or more others may be blocked. Thus, validation of a traffic signal status which is applicable to ego vehicle 2 is desirable.

Figure 6A:
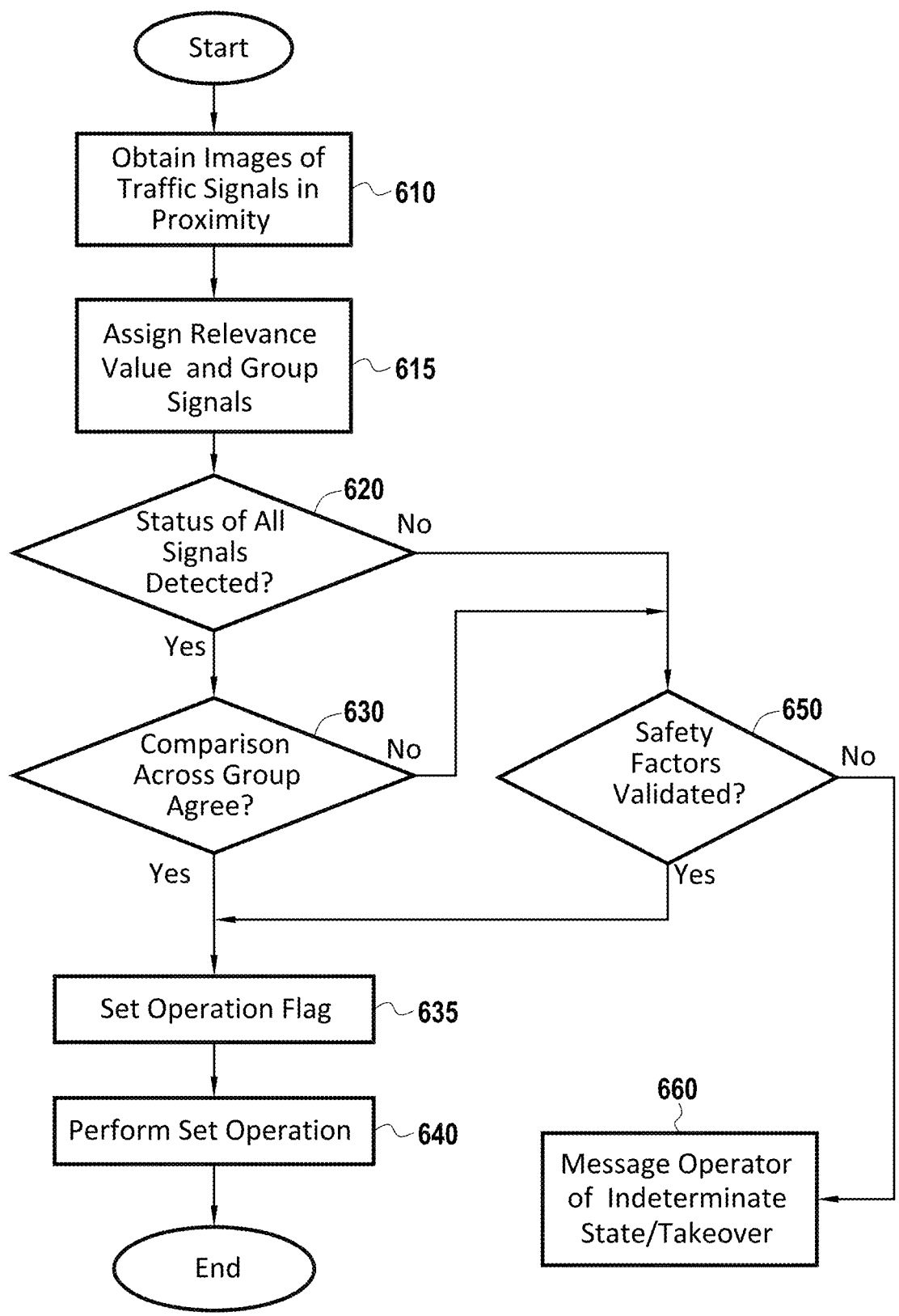
FIG. 6A is a flow chart highlighting an exemplary method according to embodiments of the present disclosure.

FIG. 6 is a flowchart highlighting an exemplary method for carrying out embodiments of the present disclosure and may be better understood by referring also to FIGS. 2-5. For purposes of explaining the present example, it will be assumed that ego vehicle 2 is stopped at an intersection having two or more traffic signals present (e.g., as shown at FIG. 3). However, one of skill in the art will recognize that the systems and methods applied herein can also be used for traffic signal verification for a moving vehicle proceeding through an intersection or other location where a plurality of traffic signals are present and detected.

As an ego vehicle 2 moves through, or arrives at a traffic scene, image obtaining means 15 may acquire images of ego vehicle's surroundings (e.g., lane information) and where present, for example, one or more traffic signals in proximity to the ego vehicle 2 (step 610). For example, as shown at FIG. 3, one or more cameras present on ego vehicle 2 may detect traffic signals 320, 330, and 340, based on an available field of view and occlusions (e.g., truck 3, which blocks signal 310).

One of skill will recognize that it may be possible to implement map information from GPS 27 to compare traffic signal configuration and placement at a particular location with information obtained from image obtaining means 15, as well as to determine information regarding a lane in which ego vehicle 2 is positioned. Such information from GPS 27 may further be useful when determining relevance values and vehicle travel direction, for example.

When image obtaining means has captured an image including one or more traffic signals, a relevance factor may then be assigned to each of the detected traffic signals in the image by ECU 10 (step 615) and the traffic signals grouped by relevance. For example, traffic signals having relevance values between 8 and 10 may be grouped together, 5 and 8 together, etc. These signal "groups" may then form the basis for further processing and evaluation within the system.

When discussing a values for relevance and threshold relevance values, it may be assumed that such relevance ranges and thresholds may be set arbitrarily based on a desired level of accuracy and factor of safety. For example, relevance values may vary between 0 and 1. Alternatively, a range of relevance values may be between 0 and 10, 1 and 100, etc.

Relevance values may be determined based, for example, on a location of the traffic signal relative to the ego vehicle 2, determined travel direction of ego vehicle 2, a status of the traffic signal, position relative to other traffic signals in the image, etc. For example, where a travel direction of ego vehicle 2 is determined to remain unchanged, a traffic signal indicating a status of "Left Turn Priority" (i.e., a green left turn arrow) may be determined to have a relevance below a threshold value for determining an effect on ego vehicle 2. Similarly, one or more signals directly in front of and in line with a travel direction of ego vehicle 2 may be given a highest priority (e.g., a value of 10).

Traffic signals having only a turn indicator and/or being positioned in line with a turning lane, while ego vehicle 2 is believed to be proceeding straight, may be assigned a relevance value of 5, for example.

Similarly, tramway signals, e.g., signals having a special color (e.g., white) and/or shape (e.g., a white -- and/or |) marks, the system can assume such a signal is not relevant to ego vehicle 2, and may assign a relevance value of, for example 0.

One of skill will recognize that signals for tramways may generally be eliminated from consideration, although they may remain helpful for certain validations. For example, where a relevant signal indicates green (i.e., proceed) but a tramway crossing is present in the line of travel and the tramway signal indicates that a tram may proceed, ECU 10 may determine that a braking or stopping action is desired to maintain a level of safety.

According to some embodiments, if a tramway signal is detected (or suspected), ECU 10 may expect a relevant traffic signal applicable to vehicles at the intersection. If the information from a tramway signal and a vehicle traffic signal are complementary (i.e., tramway signal indicates a stop, while traffic signal is green indicating go for ego vehicle 2), a determination as to action of the ego vehicle 2 can be made more reliable. This is true even if other relevant traffic signals are occluded (e.g., by truck 3).

According to another example, where a first traffic signal 350 is located to the left-front of ego vehicle 2 and a second traffic signal 310 is located to a right-front of ego vehicle 2, relevance may be assigned equally to each traffic signal (e.g., a value of 8) such that the relevance to ego vehicle 2 remains above a threshold value (e.g., 4) for each signal 310 and 350, in the absence of other traffic signals, and these signals grouped together a signal group (A).

Once the traffic signals have been identified and grouped, the system determines and monitors the status (e.g., red, yellow, green) for each of the traffic signals present, and performs a comparison among traffic signals in a signal group (step 620). Where all traffic signals in a signal group agree as to status (e.g., all signals show green, all signals show red, etc.) (step 620: yes), an operation flag may be set (step 635) according to the agreed status of the traffic signals of the group (e.g., green=maintain/accelerate, yellow/red=slow/stop).

Once the operation flag has been set, ECU 10 may issue commands to the various systems of the ego vehicle 2 to effect the operation (step 640). For example, where a red/yellow traffic signal status is determined, the braking system may be actuated or maintained. Where a green traffic signal status has been determined, acceleration or current speed maintenance may be caused. In another example, where a green turn signal has been determined, steering may be actuated to cause the turn in conjunction with braking or acceleration as desired for driving comfort/level.

One of skill will recognize that agreement among the signals of a signal group as to status (step 620: yes) may be interpreted as "semi-definitive." For example, if all signal statuses agree, but a pedestrian in a path of ego vehicle 2 is detected by a separate system, steps 635 and 640 may be overridden by ECU 10.

If a comparison among the identified traffic signals shows that the traffic signals of a relevant signal group (A; B) are not in agreement, and/or if one or more of the plurality of traffic signals has become blocked from field of view 4 such that comparison can no longer be performed (step 620: no), the ECU 10 may conduct an evaluation of various safety factors to determine how the operation flag should be set (step (650). Such a determination may be based on the relevance values of two or more relevant traffic signal fixtures in a group, respective status of each of the two or more relevant traffic signal fixtures, and in some embodiments, the motion status of the one or more vehicles surrounding the vehicle, among others.

Figure 6B:
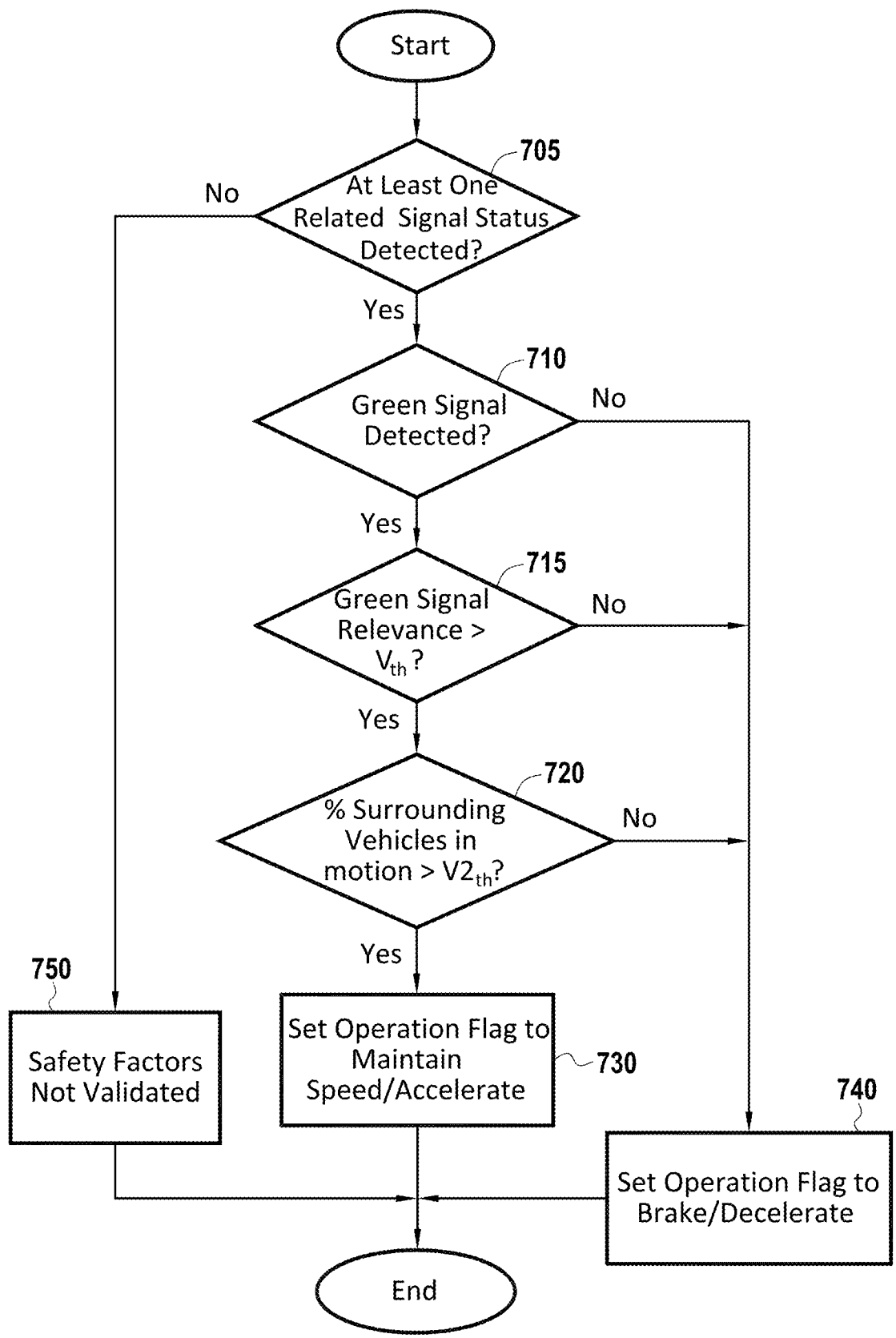
FIG. 6B shows an exemplary flowchart for evaluation and validation of one or more safety factors, according to embodiments of the present disclosure.

FIG. 6B shows an exemplary flowchart for evaluation and validation of one or more safety factors, according to embodiments of the present disclosure. Means for evaluating safety factors are described hereafter with reference to FIGS. 5A and 5B.

ECU 10 may determine whether a status of at least one signal of a relevant signal group has been determined (step 705). If no status of any relevant signal group is obtained (e.g., all signals occluded) (step 705: no), ECU 10 may determine that no safety factors may be evaluated and an operation flag set accordingly (step 750). ECU may then return to the flowchart of FIG. 6A. Where the safety factors could not be validated for whatever reason (step 650: no), a message may be provided to an operator/passenger of the vehicle advising of the indeterminate state (step 660). Such a message may be displayed on display device 25 with an indicated level of urgency intended to draw the operator/passengers attention, and may further advise manual takeover of vehicle driving functions.

Returning to FIG. 6B, if for example, as one of skill may imagine at FIG. 5B, truck 3 were to be positioned such that one signal of signal group A were blocked, ECU may still obtain status as to one signal of group A, and also status of group B. In this case (step 705: yes), ECU 10 may proceed to step 710 for an evaluation of the determined status.

When evaluating the statuses of the visible signals of a signal group, similar to the image shown at FIG. 5B (i.e., all signals of A and all signals of B indicate red), it may be determined that none of the signals indicate a green/go status (step 710: no). In such a case, ECU 10 may determine that the ego vehicle 2 should stop or remain stopped, as determined by a current state of ego vehicle 2, and the operation flag is set to brake and/or decelerate (step 740).

Where at least one relevant signal status is determined to be green/go (or, e.g., green/turn), a relevance value of the traffic signal indicating the green status may be checked to determine whether such status is above a threshold value $V_{th}$ for making a determination to accelerate or continue in motion for ego vehicle 2 (step 715). As noted above, each signal in a scene that has been detected by image obtaining means 15 may be assigned a relevance value, and signals grouped based on relevance values $V_r$. Because certain signals of a signal group may be blocked, and therefore, a status undetermined, evaluation of a relevance value $V_r$ for other signals in a signal group may become important for safety factor evaluation. For example, where a signal group comprises a signals of relevance 10, 8, and 7 (i.e., three signals), but status of only the third signal can be determined (i.e., relevance of 7), a safety evaluation may be undertaken to determine whether the signal's relevance value $V_r$ is sufficiently high to proceed according to the signal status (step 715). If the detected status of the signal in question has a relevance value $V_r$ less than a threshold value (step 715: no), then the detected green signal status is ignored for purposes of the present situation, and the operation flag is set to brake and/or decelerate (step 740).

Where it has been determined that the signal having green signal status also has a relevance value $V_r$ above a threshold value $V_{th}$, ECU 10 may request information regarding motion of surrounding vehicles from image obtaining means 15 for a determination of confidence (step 720).

For example, image obtaining means may provide information regarding a number of surrounding vehicles remaining in motion, slowing, or even remaining stopped, relative to the ego vehicle 2. A percentage of vehicles for each motion status may then be compared to a second threshold value V2th, to determine whether confidence may be had in the determination of green light status (step 720).

According to some embodiments, where, for example, a second threshold of at least 75 percent of surrounding vehicles remain in or commence motion (step 720: yes), it may be determined that confidence may be had in a green signal status for ego vehicle 2, and the operation flag may be set to accelerate/maintain speed (step 730). One of skill will recognize that a second threshold of 75 percent is intended as exemplary only, and second threshold $V2_{th}$ may be set according to a desired factor of safety. For example, a second threshold may be set at 60 percent, 70 percent, 80 percent, 90 percent, or even 100 percent, and any value in between in order to satisfy a desired safety level for ego vehicle 2 and surrounding vehicles.

Where the second threshold value V2th corresponding to the number of vehicles in motion has not been detected by ECU 10, the operation flag may be set to brake/decelerate, in order to ensure that the safer action is taken at the present intersection (step 740).

In an alternative to the above scenarios, a status for all signals of groups A and B may be detected but one or more statuses among the detected signals may not agree (i.e., A≠B, A≠A', or B≠B'). In this case, each detected status may be retained by ECU 10 for further processing within the method depicted at FIG. 6B, and each status passed through the flowchart. Alternatively, statuses in such a scenario may be processed in order from highest relevance value $V_r$ to lowest relevance value in order to determine how the operation flag should be set.

Once the operation flag has been set following either agreement among all relevant signals (step 635) or following safety factor validation, processing may pass to step 640 for execution of the operation flag as set. In other words, where a signal flag has been set to brake/decelerated, ECU 10 may cause braking, deceleration, and/or maintenance of a vehicle in a stopped position.

Alternatively, where an accelerate/maintain speed flag has been set, ECU 10 may issue commands to cause such acceleration and/or maintenance of speed of ego vehicle 2.

One of skill will recognize that variations on the examples described herein may be considered without departing from the scope of the appended claims. For example, safety factor validation may take into consideration general traffic patterns as presently detected as well as historical traffic patterns when evaluating how to proceed. According to some embodiments, a second threshold value V2th may be adjusted according to a historical safety rating of an intersection. In other words, where an intersection has a history of high accident rates, second threshold value V2th may be adjusted such that a green/go status is only validated upon 100 percent of other vehicles in motion is detected.

Further, while not discussed in detail herein, a yellow/orange caution signal has generally been interpreted and equated as a red/stop status in order to increase a factor of safety. However, this may be adjusted as desired system wide, or on an intersection by intersection basis. For example, at a historically "safe" intersection, a yellow light may be interpreted based on ego vehicles distance from the intersection and a historical timing of the traffic signals at said intersection. One of skill in the art will understand that how an intersection is designated as historically safe may be determined based on authoritative reports generated by local government or other responsible traffic maintenance entities.

Moreover, while the systems and methods described herein are intended to function in the absence of map/GPS data provided by an onboard GPS system, such information may be used to further validate/enhance the decisions made by ECU 10. For example, where image detection means 15 has detected 4 relevant traffic signals at an intersection, and intends, based on relevance, to group the 4 signals as one signal group, GPS data may be used to confirm the presence of the 4 signals and their relevance.

Still further, ECU 10 may be configured to provide an indication to an operator/passenger via display 25 of the operation flag that has been set, and may provide a predetermined time allowing operator/passenger to override the flagged operation. In so doing, an operator/passengers attention may be called to display 25 and an existing driving scene, and an evaluation made by operator passenger as to the decided operation of ECU 10.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A traffic signal fixture verification system for an ego vehicle, comprising:
   optical recognition means configured to obtain one or more images of two or more traffic signal fixtures in proximity to the ego vehicle, and to detect a motion status of one or more vehicles in proximity to the ego vehicle;
   processing means configured to:
     determine relevance values for a plurality of traffic signal fixtures identified in the one or more images;

group each of the plurality of traffic signal fixtures that have a same reference value into respective signal groups;
determine which one of the signal groups has relevance values greater than a threshold value;
monitor a status of each of the traffic signal fixtures in the signal group, from among the respective signal groups, that has the relevance values greater than the threshold value;
perform a comparison among all of the traffic signal fixtures in the signal group that has been monitored to determine whether the status of all of the traffic signal fixtures are identical; and
upon the determination that the status of all of the traffic signal fixtures in the monitored signal group are identical, actuate an accelerator function or a braking function of the ego vehicle based on the status of all the traffic signals fixtures in the signal group, and
upon the determination that the status of all of the traffic signal fixtures in the monitored signal group are not identical, actuate an accelerator function or a braking function of the ego vehicle based on at least one of (i) the status of the traffic signal fixture in the signal group that has a highest safety factor or (ii) the motion status of the one or more vehicles surrounding the ego vehicle.

2. The traffic signal fixture verification system according to claim 1, wherein when the status of one of the traffic signal fixtures in the signal group cannot be determined, a status of another traffic signal fixture from another of the respective signal groups is monitored and used for the actuation.

3. The traffic signal fixture verification system according to claim 1, wherein the status having the highest safety factor corresponds to a stop light or a caution light of a traffic signal fixture.

4. The traffic signal fixture verification system according to claim 1, wherein the processing means is configured to receive map data associated with traffic signal fixture locations, and to use the map data in the relevance value determination.

5. The traffic signal fixture verification system according to claim 1, wherein a distance of each of the plurality of traffic signal fixtures from the ego vehicle is considered in the relevance value determination.

6. The traffic signal fixture verification system according to claim 1, wherein upon detection of a change in motion status of the one or more vehicles surrounding the ego vehicle being greater than a threshold percentage change, the change in motion status is considered for the actuating.

7. A method for verifying a status of a traffic signal fixture from an ego vehicle, comprising:
obtaining one or more images of two or more traffic signal fixtures in proximity to the ego vehicle;
detecting a motion status of one or more vehicles in proximity to the ego vehicle;
determining relevance values for a plurality of traffic signal fixtures identified in the one or more images;
grouping each of the plurality of traffic signal fixtures that have a same reference value into respective signal groups;
determining which one of the signal groups has relevance values greater than a threshold value;
monitoring a status of each of the traffic signal fixtures in the signal group, from among the signal groups, that has the relevance values greater than the threshold value;
perform a comparison among all of the traffic signal fixtures in the signal group that has been monitored to determine whether the status of all of the traffic signal fixtures are identical; and
upon the determination that the status of all of the traffic signal fixtures in the monitored signal group are identical, actuating an accelerator function or a braking function of the ego vehicle based on the status of all the traffic signals fixtures in the signal group, and
upon the determination that the status of all of the traffic signal fixtures in the monitored signal group are not identical, actuating an accelerator function or a braking function of the ego vehicle based on at least one of (i) the status of the traffic signal fixture in the signal group that has a highest safety factor or (ii) the motion status of the one or more vehicles surrounding the ego vehicle.

8. The method for verifying a status of a traffic signal fixture according to claim 7, wherein when the status of one of the traffic signal fixtures in the signal group cannot be determined, a status of another traffic signal fixture from another of the respective signal groups is monitored and used for the actuation.

9. The method for verifying a status of a traffic signal fixture according to claim 7, comprising receiving map data associated with traffic signal fixture locations, and to using the map data in the relevance value determination.

10. The method for verifying a status of a traffic signal fixture according to claim 7, wherein upon detection of a change in motion status, greater than a threshold percentage change, of the one or more vehicles surrounding the ego vehicle, the change in motion status is considered for the actuation.

* * * * *